(12) United States Patent
    Hauk

(10) Patent No.: US 12,163,601 B2
(45) Date of Patent: Dec. 10, 2024

(54) SEAL AND VALVE APPARATUS HAVING SUCH A SEAL, AS WELL AS METHOD FOR SEALING A VALVE APPARATUS

(71) Applicant: ILLINOIS TOOL WORKS INC., Glenview, IL (US)

(72) Inventor: Torsten Hauk, Neustadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 61 days.

(21) Appl. No.: 17/836,295

(22) Filed: Jun. 9, 2022

(65) Prior Publication Data

US 2022/0397202 A1    Dec. 15, 2022

(30) Foreign Application Priority Data

Jun. 11, 2021    (DE) ............ 10 2021 115 120.1
May 30, 2022    (EP) .............................. 22176176

(51) Int. Cl.
| F16K 5/06 | (2006.01) |
| F16J 15/16 | (2006.01) |
| F16J 15/3236 | (2016.01) |
| F16K 5/04 | (2006.01) |
| F16K 5/18 | (2006.01) |
| F16K 5/20 | (2006.01) |

(52) U.S. Cl.
CPC ........... *F16K 5/0668* (2013.01); *F16J 15/164* (2013.01); *F16J 15/3236* (2013.01); *F16K 5/0471* (2013.01); *F16K 5/0689* (2013.01); *F16K 5/188* (2013.01); *F16K 5/205* (2013.01)

(58) Field of Classification Search
CPC .... F16K 5/0668; F16K 5/0471; F16K 5/0689; F16K 5/188; F16K 5/205; F16K 11/085; F16K 11/087; F16K 11/0876; F16K 11/0856; F16K 27/065; F16K 27/067; F16J 15/164; F16J 15/3236; F16J 15/3232
USPC ......................................... 251/314, 317, 316
See application file for complete search history.

(56) References Cited

U.S. PATENT DOCUMENTS

| 2,858,098 A | * | 10/1958 | Sanctuary | ............. F16K 5/0668 |
| | | | | 251/315.12 |
| 3,398,926 A | * | 8/1968 | Scaramucci | .......... F16K 5/0668 |
| | | | | 251/328 |
| 3,462,120 A | * | 8/1969 | Priese | ................... F16K 5/0673 |
| | | | | 251/317 |
| 3,488,033 A | * | 1/1970 | Priese | ..................... F16K 5/202 |
| | | | | 251/315.08 |

(Continued)

FOREIGN PATENT DOCUMENTS

| EP | 1739305 A1 | 1/2007 |
| WO | WO-2008020282 A2 | 2/2008 |

*Primary Examiner* — Craig M Schneider
*Assistant Examiner* — Andrew J Rost
(74) *Attorney, Agent, or Firm* — THOMPSON HINE LLP

(57) ABSTRACT

A valve apparatus, in particular a ball valve apparatus, is provided. The apparatus includes a housing device having at least one fluid port, a closure body, wherein the closure body includes an axis of rotation about which the closure body can be rotated in a direction of rotation in order to release and close the fluid port, wherein the fluid port includes a seal for sealing abutment against the closure body. The seal includes a first and a second sealing lip, wherein the sealing lips are configured such that, during operation, only one seal sealingly abuts against the closure body.

10 Claims, 2 Drawing Sheets

(56) References Cited

U.S. PATENT DOCUMENTS

| | | | | |
|---|---|---|---|---|
| 3,617,027 A | * | 11/1971 | Scaramucci | F16K 5/0668 |
| | | | | 251/315.01 |
| 3,671,010 A | * | 6/1972 | Scaramucci | F16K 27/067 |
| | | | | 251/315.04 |
| 3,848,938 A | * | 11/1974 | Stella | F16J 15/3232 |
| | | | | 384/291 |
| 4,236,691 A | | 12/1980 | Wright | |
| 4,883,253 A | | 11/1989 | Hashimoto | |
| 4,899,980 A | * | 2/1990 | Kemp | F16K 41/046 |
| | | | | 251/174 |
| 6,435,474 B1 | * | 8/2002 | Williams | F16K 51/02 |
| | | | | 251/368 |
| 6,533,241 B1 | * | 3/2003 | Chen | F16K 5/205 |
| | | | | 251/173 |
| 7,325,783 B2 | * | 2/2008 | Hunter | F16K 3/0227 |
| | | | | 251/363 |
| 7,891,878 B2 | * | 2/2011 | Peschke | F16C 33/74 |
| | | | | 384/147 |
| 10,337,395 B2 | * | 7/2019 | Crusius | F16K 11/076 |
| 10,487,878 B2 | * | 11/2019 | Voisine | F16C 23/043 |
| 2004/0036052 A1 | | 2/2004 | Nowak | |
| 2006/0162792 A1 | | 7/2006 | Oh | |
| 2021/0022278 A1 | | 7/2021 | Gramss | |

* cited by examiner

SEAL AND VALVE APPARATUS HAVING SUCH A SEAL, AS WELL AS METHOD FOR SEALING A VALVE APPARATUS

TECHNICAL FIELD

The present invention relates to a seal and a valve apparatus, in particular a ball valve apparatus, having such a seal and a method for sealing a valve apparatus.

BACKGROUND

A ball valve is understood to be a valve in which the sealing action is produced by a moving ball. In its typical use as a check valve, the ball prevents the return flow of fluid through the valve.

Ball valves can be used as actively controlled or regulated valves. Here, a spherical shut-off body is actively actuated or rotated by an actuator. In the case of a ball valve, the shut-off body performs a rotational movement in order to open or close one or more flow cross-sections.

The ball is usually significantly larger (1.4 to 1.5 times as large) than the middle valve seat width. The valve seat is designed as an oblique surface and not as a ball shell, so that there is only a linear contact between the ball and the seat. It is this restriction to a line that prevents an adhesion of the ball to the valve seat, on the one hand, and establishes the robustness of the ball valve against particulate inclusions in the flowing matter, on the other hand. The inclusions are displaced from the sealing line by the ball approaching the valve seat. Due to the inevitable rotation of the ball in the case of a mass flowing through the valve, a different part of the ball always comes into contact with the seat, and, in combination with a suitable choice of ball and valve seat materials, wear can be limited to the ball. The ball surface is thus evenly worn without the valve function being affected by this wear.

During operation, ball valves are never fully sealing, but, when used with particulate-containing contaminants of the flowing substances, are never completely non-sealing.

DE 10 2018 117 240 A1 describes a coolant valve for a vehicle, comprising a housing having a plurality of coolant ports and a valve element that is arranged adjustably within the housing for connecting or disconnecting coolant ports, as well as at least one sealing arrangement arranged in the region of at least one coolant port, which abuts sealingly against the housing, on the one hand, and against the valve element, on the other hand, wherein the sealing arrangement comprises a carrier element made of a first material and a sealing element made of a second material, wherein the second material is softer than the first material, wherein the sealing element comprises a first sealing lip abutting against the valve element and the carrier element comprises a support portion, wherein the first sealing lip protrudes with a free end over the support portion, and wherein the first sealing lip is pressed against the support portion during a coolant flow through the coolant valve.

Such coolant valves are used in cooling circuits of vehicles, such as cars or trucks. They are used in order to cool an internal combustion engine, for example. Depending on the position of the valve element, for example, cooling liquid is passed by a radiator via a bypass line during a warmup phase of the internal combustion engine and, after reaching the operating temperature, passed through the radiator. In the case of coolant valves, depending on the application, it is also possible for coolant to flow only temporarily through the coolant valve, for example when the coolant flow is completely prevented during the cold start phase of a combustion engine. Control of the valve element can be self-actuated, for example via elements made of expanding materials. However, electric drives for adjusting the valve element are also possible, which are controlled by a control device.

For example, to seal the coolant ports against the valve element, annular sealing arrangements are provided, which, on the one hand, abut sealingly against the housing, in particular the housing portion that delimits the coolant port, and on the other hand sealingly against the valve element.

For example, a coolant valve having such a seal assembly is known from EP 2 052 177 B1. The thermostat valve described therein has a spherical valve element, wherein the sealing arrangement comprises a slip ring made of slidable, solid plastic that is biased against the valve element by an elastomeric sealing ring. The slip ring can be made of, for example, Teflon (poly-tetrafluoroethylene) and the elastomeric sealing ring can be made of EPDM (ethylene-propylene-diene rubber). With the known thermostat valve, a reliable seal can be achieved at any time. However, significant costs are associated with the known sealing arrangement.

One problem with known sealing arrangements of coolant valves is that there is a conflict of goals between a reliable attachment of the sealing arrangement to the valve element and thus a secure sealing even at low system pressure, on the one hand, and a high resiliency and low avoidance at high pressure in case of low friction torques and thus low drive torques for the valve element, on the other hand.

SUMMARY

Based on the discussed prior art, the problem of the invention is to provide a valve apparatus, in particular a coolant valve of the above-mentioned type, as well as a method for sealing a valve apparatus, which, while being manufactured inexpensively, solves the discussed conflict of goals as well as possible.

The problem of the present invention is also to provide a seal and a valve apparatus having such a seal, in particular a ball valve apparatus, which provides an alternative to known seals and valve apparatuses.

A further problem of the present invention is to provide a seal and a valve apparatus having an improved sealing action.

Another problem of the present invention is to provide a seal and a valve apparatus that are safe and reliable in operation.

According to the invention, a valve apparatus, in particular a ball valve apparatus, is provided. Said apparatus comprises a housing device having at least one fluid port, a closure body, wherein the closure body comprises an axis of rotation about which the closure body can be rotated in a direction of rotation in order to release and close the fluid port, wherein the fluid port comprises a seal for sealing abutment against the closure body. The present invention is characterized in that the seal comprises a first and a second sealing lip, wherein the sealing lips are configured such that, during operation, at least during an operating state, only one of the two seals sealingly abuts against the closure body.

An operating state can be a normal flow (flow from an inlet to an outlet), return flow (flow from an outlet to an inlet), or a standstill (no or almost no flow of the valve).

Thus, according to the invention, it is provided that the first and the second sealing lips alternately abut against a surface of the closure body in a sealing manner.

In a valve apparatus, in particular a ball valve apparatus, different pressure gradients are present on a valve side of the valve apparatus and on a port side of the valve apparatus, depending on the valve position. The inventors of the present invention have recognized that, depending on the pressure difference between a valve side and a port side, or depending on the direction of flow of the valve apparatus, these pressure differences can be exploited in order to alternately press either the first or the second sealing lip to the closure body.

In the context of the present invention, the phrase "that there is a higher pressure at a port side" means that a higher pressure is applied to a side of the seal in the region of a fluid port of the valve apparatus. Such a state is referred to as a first operating state.

In the first operating state, the first sealing lip thus sealingly abuts against the closure body, wherein the port side is exposed to a higher pressure than the valve side.

In the context of the present invention, the phrase "that there is a higher pressure at a valve side" means that a higher pressure is applied to a side of the seal in the region of a closure body of the valve apparatus. Such a state is referred to as a second operating state.

In the second operating state, the second sealing lip thus sealingly abuts against the closure body, wherein the valve side is exposed to a higher pressure than the port side.

In this way, an alternative to seals known from the prior art is provided for valve apparatuses, in particular for ball valve apparatuses.

In addition, a seal having an improved sealing effect is provided, because the first or the second sealing lip do not abut against the closure body due to its biasing, but rather are pressurized against the surface of the closure body, which leads to an increased sealing effect. In addition, this increases the return flow tightness.

The first and second sealing lips thus each have a sealing edge of a sealing lip for a respective pressure seal towards the valve side or towards the port side.

It is preferably provided that the first and the second sealing lip alternately sealingly abut against the closure body as a function of the pressure difference between the port side and the valve side, respectively, such that when the port side is exposed to a higher pressure, the first sealing lip sealingly abuts against the closure body, and when the valve side is exposed to a higher pressure, the second sealing lip sealingly abuts against the closure body.

Thus, in the apparatus according to the invention, it is always only either the first or the second sealing lip that completely sealingly abuts against the closure body.

The non-sealing sealing lip can then have a distance of approximately 1 mm to 3 mm, and in particular approximately 1 mm to 2 mm, from the surface of the closure body.

The valve apparatus according to the present invention can be a coolant valve that is provided for a vehicle, such as a car or truck. The coolant valve can be disposed in a cooling circuit of a vehicle having an internal combustion engine or an electric motor or a hybrid vehicle. For example, it can be provided for cooling an internal combustion engine or batteries of an electric vehicle. The coolant valve can be a thermostat valve. An electric drive can be provided for adjusting the valve element, which drive is controlled by a control device of the vehicle. However, it is also possible that a temperature-dependent control element is provided, for example an element made of expanding material, which changes its length depending on the temperature and thereby adjusts the valve element or the closure body. The housing or housing device of the coolant valve has two or more than two coolant or fluid ports, which can be connected to, for example, coolant lines of a cooling circuit of a vehicle. For example, by adjusting the valve element, two coolant ports can be connected to or disconnected from one another. For example, if the housing has three coolant ports, by adjusting the valve element, for example, coolant supplied to one of the coolant ports can be supplied to either a first or a second one of the two other coolant ports. For example, the two other coolant ports can be connected to a radiator on the one hand and to a bypass line on the other hand in order to bypass the radiator. It is also possible that, during operation of the coolant valve, coolant cannot flow through the cooling circuit and thus through the coolant valve at times, for example during a cold start phase of an internal combustion engine. A cooling liquid, such as cooling water, is in particular considered as the coolant here. In a manner known per se, at least one seal is provided that sealingly abuts against the valve element on the one hand and the housing on the other hand, in particular a housing portion that delimits a coolant connection. In particular, a corresponding sealing arrangement can be provided on each of the coolant ports so that the number of sealing arrangements can correspond to the number of coolant ports of the housing.

The closure body is approximately spherical or spherically segmented or approximately cylindrical, wherein one of the sealing lips abuts sealingly against a curved surface of the closure body.

Due to the fact that only one sealing lip always abuts against the closure body, no higher friction forces occur between the seal and the closure body during the operation of a valve apparatus according to the invention. Accordingly, conventional actuators can be provided for a valve apparatus according to the invention, because no higher forces or torques are required.

Compared to a double seal, in which both sealing lips always abut against a closure element, the friction resistance between the seal and the closure body is therefore significantly reduced.

The first sealing lip and the second sealing lip can be arranged at an angle greater than 60° or at an angle greater than 90° or at an angle greater than 100° or at an angle greater than 120° or at an angle greater than 130° or at an angle greater than 140° with respect to one another.

The angle between the first and the second sealing lips depends on the diameter of a closure body to be sealed. The greater the diameter of a closure body, the greater the angle between the first and second sealing lips.

Thus, a spread or angle between the first and second sealing lips can be sufficiently large such that a lip is biased, depending on whether the first or the second operating state is present, such that the first or the second sealing lip sealingly abuts against the closure body.

A diameter of the closure body can be approximately 40 mm to 70 mm. A sealing diameter or a diameter of the sealing lips can be approximately 14 mm to 30 mm.

Because the sealing lips alternately abut against a curved surface of the closure body, a corresponding angular range ensures that only the first or only the second sealing lip are exposed to a corresponding pressure via the port side or the valve side, depending on the valve position, such that a sealing lip leads to an improved sealing of a closure body.

For this purpose, the first sealing lip extends approximately orthogonally to a through-flow direction of the fluid port and approximately parallel to a curved surface of the closure body and the second sealing lip extends approximately in the opposite direction and approximately parallel to a curved surface of the closure body.

Thus, the first sealing lip can extend towards a release recess of the closure body. The second sealing lip can extend away from the release recess.

A direction of flow in the context of the present invention is understood to mean a direction extending parallel to a tubular fluid port of the valve apparatus.

The sealing effect of the seal is improved by the structural design of the first and second sealing lips described above.

Additionally, a bearing means can be provided, via which the closure body is mounted such that it can rotate in a direction of rotation about an axis of rotation.

A stiffening structure can be provided at least in portions between the first and the second sealing lips.

Such a stiffening structure can be formed by struts that are formed from the same material as the seal itself and integrally formed thereon during manufacture of the seal.

Such a connection or stiffening between the sealing lips prevents a folding of the first or the second sealing lip upon rotation of the closure body in the direction of rotation.

The seal can comprise an approximately tubular assembly portion and an approximately annular sealing portion, wherein the tubular assembly portion is connected to a tubular portion or nozzle of the fluid port.

Furthermore, a radially circumferential sealing device for sealing abutment against the fluid port can be provided on the assembly portion.

It is provided in this case that the tubular assembly portion of the seal or the flange portion is connected to a tubular portion of the fluid port by means of an interference fit.

Via the radially circumferential sealing device, which comprises for example two or more radially circumferential sealing edges, the seal itself is sealed against the port or the housing device. In this way, an integration of the seal on a tubular portion of the fluid port is possible without an additional hard component.

Additionally, the seal can comprise an approximately tubular flange portion, which is made of a harder material (hard component) than the seal and which is connected to the assembly portion of the seal, preferably by means of a 2-component injection molding process.

With such a tubular flange portion, the seal itself is stiffened and/or an assembly aid is provided for easier assembly of the seal on a nozzle of the fluid port.

Advantageously, the tubular flange portion formed from a hard component can thus be connected to the seal by means of a two-component injection molding method.

At least one release recess for releasing the fluid port can be configured in a closure body surface, wherein the first sealing lip extends in the direction of the release recess of the closure body and wherein the second sealing lip extends away from the release recess.

The seal can comprise a flap portion configured such that, when a pressure change occurs between the port side and the valve side, that is to say when the port side is exposed to a higher pressure than a valve side or vice versa, the seal folds along the flap portion such that only the first or the second sealing lip abuts sealingly against the closure body.

The flap portion can preferably be arranged radially circumferentially about the seal, in particular in the region between the first and the second sealing lips, wherein the flap portion can be hinge-like or configured as a hinge. The flap portion can also be configured by a structural configuration of the material of the seal, for example by a material weakening in this region in the manner of a film hinge or the like.

In the context of the present invention, a seal described above can represent a stand-alone idea of the invention. Such a seal can also be used for other types of fluid ports and/or valves to be sealed.

The present invention can in particular be combined in conjunction with the vehicle coolant valve described in DE 10 2018 117 240 A1. Reference to this application is hereby made in full.

Furthermore, according to the present invention, there is provided a method for sealing a valve apparatus described above, wherein a seal is provided with a first and a second sealing lip for sealing a closure body. The method comprises the following steps: sealing abutment of only the first sealing lip against the closure body when a port side of the closure body is exposed to a higher pressure than a valve side of the closure body, and sealing abutment of only the second sealing lip against the closure body when the valve side is exposed to a higher pressure than the port side.

Additionally, the seal can comprises a flap portion, wherein, when there is a pressure change between the port side and the valve side, that is to say when the port side is exposed to a higher pressure than a valve side or vice versa, the seal folds along the flap portion in such a way that only the first sealing lip abuts sealingly against the closure body when a port side of the closure body is exposed to a higher pressure than a valve side, and only the second sealing lip abuts sealingly against the closure body when [the] valve side of the closure body is exposed to a higher pressure than the port side.

The non-sealing sealing lip can then be arranged at a distance of approximately 1 mm to 3 mm, in particular approximately 1 mm to 2 mm, from the surface of the closure body.

BRIEF DESCRIPTION OF THE DRAWINGS

The present invention will now be described in more detail on the basis of an exemplary embodiment shown in the figures. The figures show.

DETAILED DESCRIPTION

Figure 1:
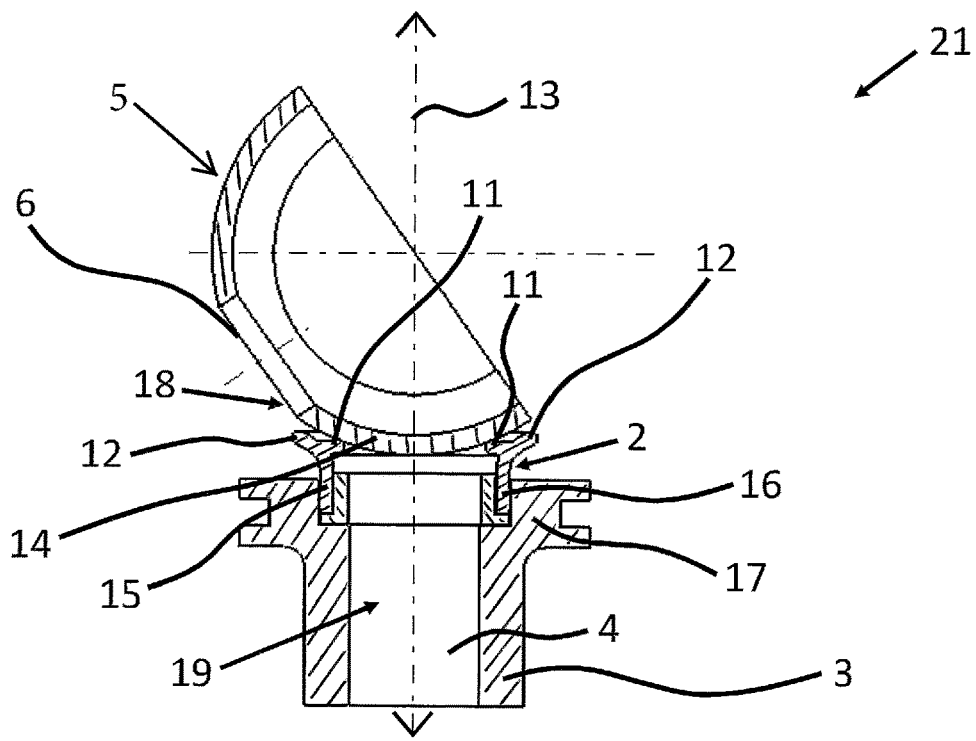
FIG. 1 a schematic side-cut view of a valve apparatus having a seal according to the invention in a first operating state in which a first sealing lip sealingly abuts against a closure body when a port side is exposed to a higher pressure than a valve side.

In the following, a valve apparatus 1, in particular a ball valve apparatus, with a seal 2 according to the invention is described in more detail (FIGS. 1 to 5).

The valve apparatus 1 comprises a housing device 3 having at least one fluid port 4.

A spherically segmented closure body 5 is provided in order to close and open the fluid port 4.

The closure body 5 comprises a release recess 6 in order to allow a fluid to flow through the closure body.

Furthermore, a bearing means 7 is provided, via which the closure body 5 is mounted such that it can rotate in the direction of rotation 8 about an axis of rotation 9.

The seal 2 is provided on the fluid port 4 for sealing abutment against the closure body 5.

The seal 10 comprises a first and a second sealing lip 11, 12, wherein the sealing lips 11, 12 are configured such that, during operation, only one of the sealing lips 11, 12 sealingly abuts against the closure body 5.

The first sealing lip 11 and the second sealing lip 12 are arranged at an angle between 60° and 140° to one another. A suitable angle between the first sealing lip 11 and the second sealing lip 12 depends on the curvature or corresponding radius of the spherical or spherically segmented closure body 5. The greater the radius of the closure body 5, the greater the angle between the first sealing lip 11 and the second sealing lip 12.

The first sealing lip 11 extends approximately orthogonally to a flow direction 13 of the fluid port 4 and towards the fluid port 4 as well as approximately parallel to a curved surface 14 of the closure body 5.

The second sealing lip 12 extends approximately parallel to the curved surface 14 of the closure body 5 and away from the fluid port 4.

The portion of the seal in which the first and second sealing lips 11, 12 are provided is approximately annular in configuration, wherein the first sealing lip 11 extends approximately radially inward and the second sealing lip 12 is positioned at a predetermined angle between 60° and 130° to the first sealing lip, as described above.

An approximately tubular assembly portion 16 is integrally formed with the annular portion 15 of the seal.

Via the tubular assembly portion 16, the seal 2 is fitted with a tubular portion or port 17 of the fluid port 4.

The seal 2 is formed from a soft component. An interference fit for connecting the seal 2 to the nozzle 17 is provided.

Furthermore, the tubular assembly portion 16 can comprise an approximately tubular flange portion (not shown) formed from a harder material than the seal 2 or from a hard component. It is preferably connected to the assembly portion 16 of the seal 2 by means of a two-component injection molding process.

A stiffening structure 20 is provided at least in some portions between the two sealing lips 11, 12.

Figure 2:
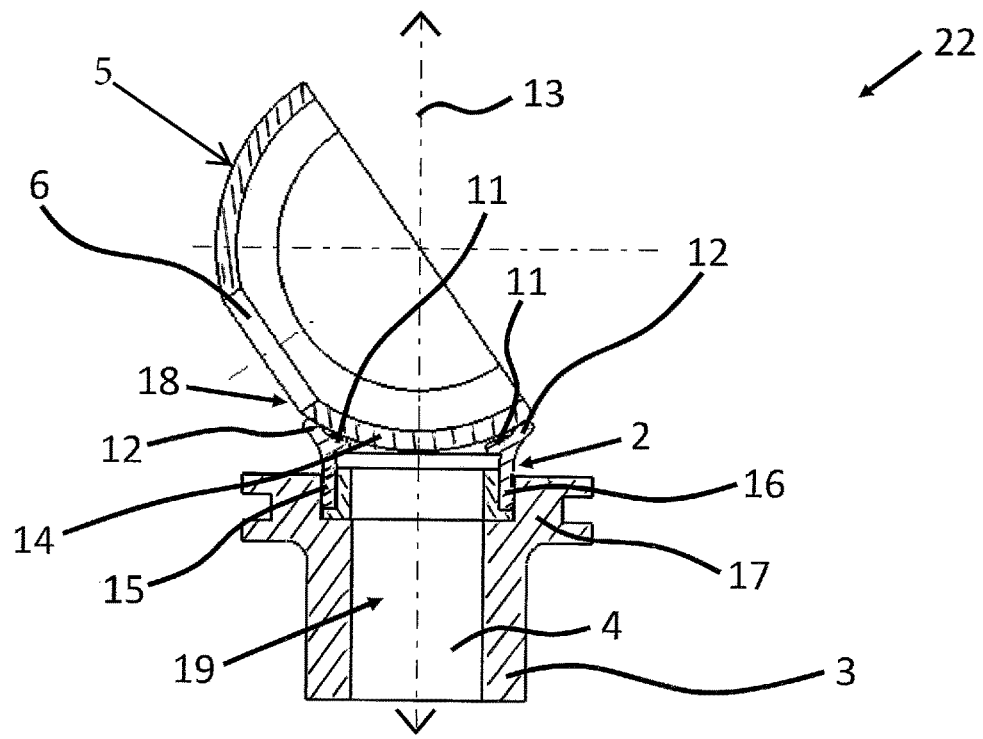
FIG. 2 a further schematic side-cut view of a valve apparatus having a seal according to the invention in a second operating state in which a second sealing lip sealingly abuts against a closure body when a valve side is exposed to a higher pressure than a port side, and FIG. 3 a side-cut view of a valve apparatus in which a seal according to the invention can be used.
Figure 3:
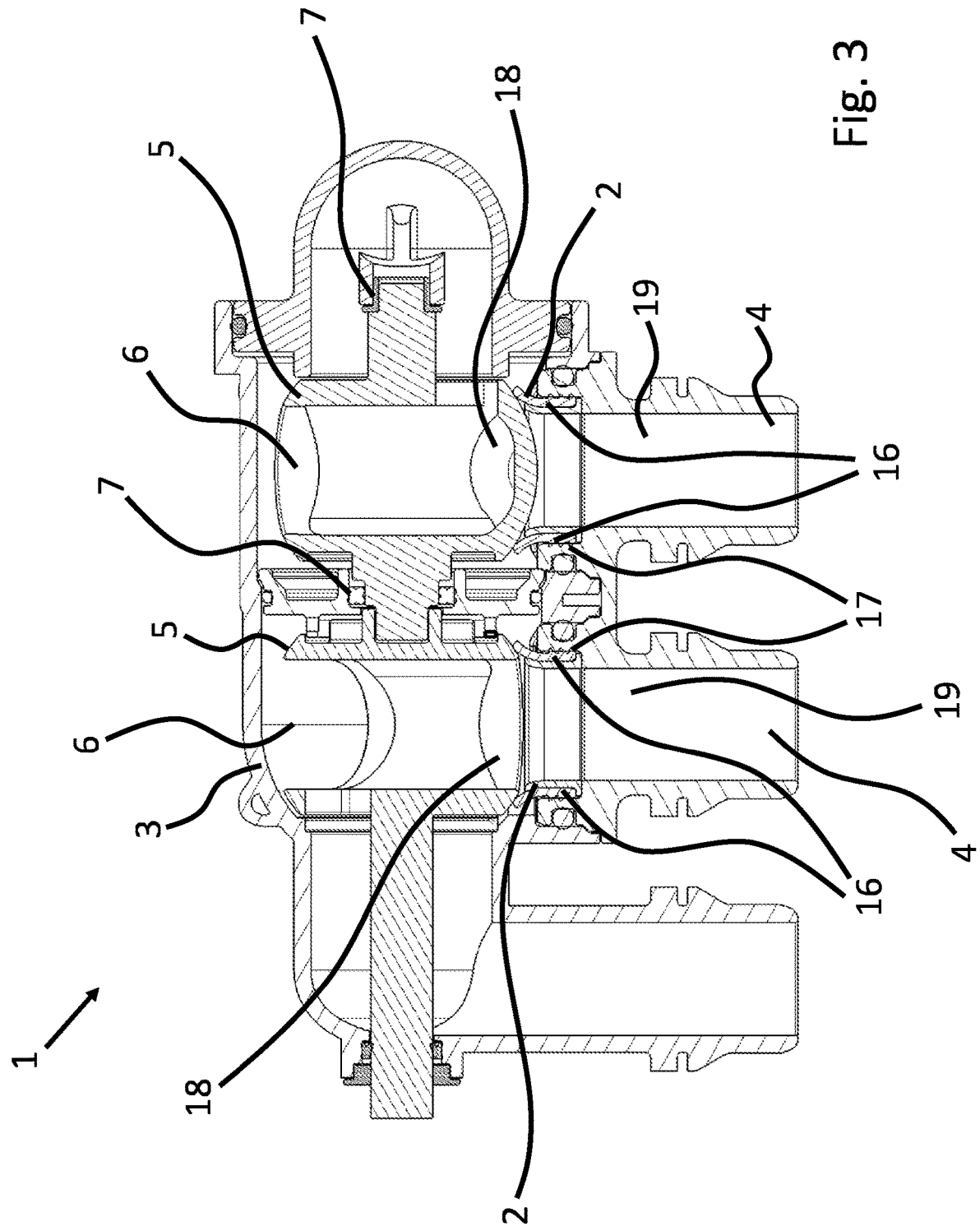

If a pressure on a valve side 18 is present in the valve apparatus, or if a higher pressure is present on the valve side in the region of the housing device 3 or the closure body 5, then the second sealing lip 12 is pressed onto a curved surface of the closure body 5 (FIG. 2).

In particular, it is provided here that only the second sealing lip 12 radially circumferentially abuts against the closure body 5 in a sealing manner about a corresponding release recess 6.

Such a pressure is hereinafter referred to as the valve-side pressure and the second operating state 22.

If, on the other hand, an increased pressure is present in the region of the fluid port 4, then, correspondingly, only the first sealing lip 11 sealingly abuts a curved surface of the closure body 5 (FIG. 1). A pressure from this side is hereinafter referred to as the port-side pressure and the first operating state 21.

Furthermore, according to the present invention, there is provided a method for sealing a valve apparatus 1 described above, wherein a seal 2 is provided with a first and a second sealing lip 11, 12 for sealing a closure body 5.

The method comprises the following steps:

sealing abutment of only the first sealing lip 11 against the closure body 5 when a port side 19 is exposed to a higher pressure than a valve side 18 (first operating state 21; FIG. 1), and Sealing abutment of only the second sealing lip 12 against the closure body 5 when the valve side 18 is exposed to a higher pressure than the port side 19 (second operating state 22; FIG. 2).

Additionally, the seal can comprise a flap portion (not shown), wherein, when there is a pressure change between the port side and the valve side, that is to say when the port side 19 is exposed to a higher pressure than the valve side 18 or vice versa, the seal 2 folds along the flap portion in such a way that only the first sealing lip 11 abuts sealingly against the closure body 5 when the port side 19 of the closure body 5 is exposed to a higher pressure than a valve side 19 [sic: 18], such that a first operating state 21 is given (FIG. 1), and only the second sealing lip 12 abuts sealingly against the closure body 5 when the valve side 18 of the closure body 5 is exposed to a higher pressure than a port side 19, such that a second operating state 22 is given (FIG. 2).

The non-sealing sealing lip is then arranged at a distance of approximately 1 mm to 3 mm, in particular approximately 1 mm to 2 mm, from the surface of the closure body 5.L

LIST OF REFERENCE NUMERALS

1 Valve apparatus
2 Seal
3 Housing device
4 Fluid port
5 Closure body
6 Release recess
7 Bearing device
8 Direction of rotation
9 Axis of rotation
10
11 First sealing lip
12 Second sealing lip
13 Through-flow direction
14 Curved surface
15 Annular sealing portion
16 Assembly portion
17 Tubular portion
18 Valve side
19 Port side
20 Stiffening structure
21 First operating state
22 Second operating state

The invention claimed is:

1. A valve apparatus, comprising:
a housing device having at least one fluid port,
a closure body, wherein the closure body comprises an axis of rotation about which the closure body can be rotated in a direction of rotation in order to release and close the fluid port, wherein the fluid port comprises a seal for sealing abutment against the closure body;
wherein the seal comprises a first sealing lip and a second sealing lip, wherein the first and second sealing lips are configured such that, during operation, at least during an operating state, only one of the first sealing lip or the second sealing lip sealingly abuts against the closure body;
wherein the seal is configured such that, as a function of a pressure difference between a port side of the valve apparatus and a valve side of the valve apparatus, the first sealing lip and the second sealing lip alternately abut sealingly against the closure body in such a way that, when the port side is exposed to a higher pressure than the valve side in a first operating state, only the first sealing lip sealingly abuts against the closure body, and when the valve side is exposed to a higher pressure than the port side in a second operating state, only the second sealing lip sealingly abuts against the closure body;

wherein the first sealing lip and the second sealing lip are arranged at an angle greater than 120° with respect to one another.

2. The valve apparatus according to claim 1, wherein the closure body is approximately spherical or spherically segmented or approximately cylindrical, wherein the first and second sealing lips alternately abut sealingly against a curved surface of the closure body.

3. The valve apparatus according to claim 2, wherein the first sealing lip extends in a first direction approximately orthogonally to a through-flow direction of the fluid port and approximately parallel to the curved surface of the closure body and the second sealing lip extends approximately in a second direction, opposite to the first direction, and approximately parallel to the curved surface of the closure body.

4. The valve apparatus according to claim 1, wherein the seal comprises an approximately tubular assembly portion and an approximately annular sealing portion, wherein the tubular assembly portion is connected to a tubular portion of the fluid port, and wherein a radially circumferential sealing device is provided for sealing abutment against the fluid port and/or that the seal comprises an approximately tubular flange portion, which is formed from a harder material than the seal and is connected to the assembly portion of the seal by a 2-component injection molding method.

5. The valve apparatus according to claim 1, wherein the seal comprises a flap portion configured such that the seal folds along the flap portion, in response to pressure conditions at the port side and the valve side, such that only the first sealing lip or only the second sealing lip abuts sealingly against the closure body.

6. The valve apparatus according to claim 1, wherein at least one release recess for releasing the fluid port is configured in a closure body surface, wherein the first sealing lip extends in a direction of the release recess of the closure body and wherein the second sealing lip extends away from the release recess.

7. A method for sealing a valve apparatus according to claim 1, comprising the following steps:
sealing abutment of only the first sealing lip against the closure body when the port side is exposed to a higher pressure than a valve side in the first operating state of the closure body, and
sealing abutment of only the second sealing lip against the closure body when the valve side is exposed to a higher pressure than the port side in the second operating state.

8. The method according to claim 7, wherein the seal comprises a flap portion, wherein the seal folds along the flap portion in such a way that:
only the first sealing lip abuts sealingly against the closure body when the port side of the closure body is exposed to a higher pressure than the valve side, and only the second sealing lip abuts sealingly against the closure body when the valve side of the closure body is exposed to a higher pressure than the port side.

9. A valve apparatus, comprising:
a housing device having at least one fluid port,
a closure body, wherein the closure body comprises an axis of rotation about which the closure body can be rotated in a direction of rotation in order to release and close the fluid port, wherein the fluid port comprises a seal for sealing abutment against the closure body;
wherein the seal comprises a first sealing lip and a second sealing lip, wherein the first and second sealing lips are configured such that, during operation, at least during an operating state, only one of the first sealing lip or the second sealing lip sealingly abuts against the closure body;
wherein the seal is configured such that, as a function of a pressure difference between a port side of the valve apparatus and a valve side of the valve apparatus, the first sealing lip and the second sealing lip alternately abut sealingly against the closure body in such a way that, when the port side is exposed to a higher pressure than the valve side in a first operating state, only the first sealing lip sealingly abuts against the closure body, and when the valve side is exposed to a higher pressure than the port side in a second operating state, only the second sealing lip sealingly abuts against the closure body;
wherein the closure body is approximately spherical or spherically segmented or approximately cylindrical, wherein the first and second sealing lips alternately abut sealingly against a curved surface of the closure body;
wherein the first sealing lip extends in a first direction approximately orthogonally to a through-flow direction of the fluid port and approximately parallel to the curved surface of the closure body and the second sealing lip extends approximately in a second direction, opposite to the first direction, and approximately parallel to the curved surface of the closure body.

10. A valve apparatus, comprising:
a housing device having at least one fluid port,
a closure body, wherein the closure body comprises an axis of rotation about which the closure body can be rotated in a direction of rotation in order to release and close the fluid port, wherein the fluid port comprises a seal for sealing abutment against the closure body;
wherein the seal comprises a first sealing lip and a second sealing lip, wherein the first and second sealing lips are configured such that, during operation, at least during an operating state, only one of the first sealing lip or the second sealing lip sealingly abuts against the closure body;
wherein the seal is configured such that, as a function of a pressure difference between a port side of the valve apparatus and a valve side of the valve apparatus, the first sealing lip and the second sealing lip alternately abut sealingly against the closure body in such a way that, when the port side is exposed to a higher pressure than the valve side in a first operating state, only the first sealing lip sealingly abuts against the closure body, and when the valve side is exposed to a higher pressure than the port side in a second operating state, only the second sealing lip sealingly abuts against the closure body;
wherein at least one release recess for releasing the fluid port is configured in a closure body surface, wherein the first sealing lip extends in a direction of the release recess of the closure body and wherein the second sealing lip extends away from the release recess.

* * * * *